Jan. 19, 1926.

P. B. CAMP 1,569,949

BRAKE MECHANISM FOR RAILWAY CARS

Filed April 11, 1925

Inventor:
Percy B. Camp
By
Gillson, Mann & Carl
Att'ys.

Patented Jan. 19, 1926.

1,569,949

UNITED STATES PATENT OFFICE.

PERCY B. CAMP, OF MAYWOOD, ILLINOIS, ASSIGNOR TO UNIVERSAL DRAFT GEAR ATTACHMENT COMPANY, A CORPORATION OF ILLINOIS.

BRAKE MECHANISM FOR RAILWAY CARS.

Application filed April 11, 1925. Serial No. 22,341.

*To all whom it may concern:*

Be it known that I, PERCY B. CAMP, a citizen of the United States, and resident of Maywood, county of Cook, and State of Illinois, have invented certain new and useful Improvements in Brake Mechanism for Railway Cars, of which the following is a specification, and which are illustrated in the accompanying drawings, forming a part thereof.

This invention relates to brake mechanism for railway cars and has for its principal objects to provide the hand brake with a multiplying lever that will not be affected by different amounts of slack. Further objects and advantages of the invention will become apparent as the description is read in connection with the accompanying drawings in which Fig. 1 is a diagrammatic view illustrating the brake mechanism at one end of the car with the present invention applied thereto;

Figure 1:
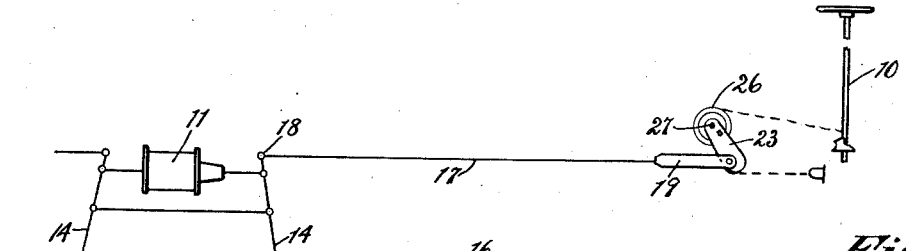

Referring to Fig. 1 of the drawings, 10 indicates a brake staff and 11 a brake cylinder, both of which serve to apply the brake shoes 12 to the wheels 13 through a foundation brake gear here illustrated as including the cylinder levers 14 operating the brake levers 15 through the cylinder lever and brake lever connections 16. The foundation brake gear varies quite widely in conventional practice, but this will serve to illustrate the application of the present invention.

The brake staff 10 operates the foundation brake gear through a hand brake rod 17 attached to the cylinder lever 14 at 18.

Figure 4:
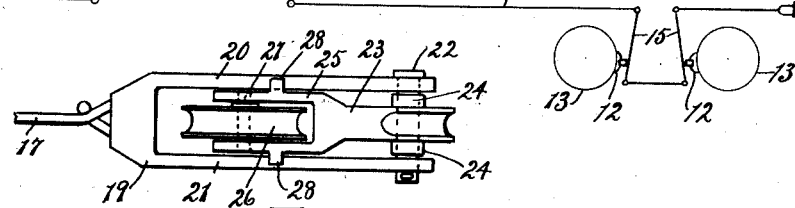
Fig. 4 is a plan view of a jaw and lever forming the principal changes in the conventional hand brake.

The hand brake rod 17 is equipped with a jaw 19 similar to the conventional jaw in which a sheave is mounted by cooperation with the brake chain. The jaw is bifurcated and has arms 20 and 21 (Fig. 4) perforated at their free ends to receive a pin 22 which, in this case, is the pivot for a multiplying lever 23. The pivoted end of the lever 23 is equipped with hollow bosses 24 which receive the pin 22 and the free end of the lever is forked, as indicated at 25, to receive a sheave 26 which is journaled on the pin 27 passing through forks. Laterally projecting lugs 28 on the lever 23 rest on the arms 20 and 21 and serve to support the lever and the sheave in the position shown in Fig. 2, until the pull on the brake chain exceeds a predetermined amount or assumes a predetermined direction.

The brake chain 29 is looped about the lever 23 and the sheave 26 with one end 30 anchored to the car at 31 and the other end 32 in winding engagement with the brake staff 10.

The dead end 30 of the chain is here shown as adjustably anchored to the brake step 33 by means of the invention forming the subject matter of application Serial No. 752,535, by Henry I. Wrigley, filed November 28, 1924.

The pivoted end of the lever 23 is curved and grooved as indicated at 34 to receive and cooperate with the dead or anchored end of the chain when the lever is rotated about the pin 22, and in order to prevent the relative sliding movement between the chain and the lever some sort of engaging devices are provided, illustrated in the present disclosure by the spike or tooth 35.

The brake mechanism made according to this invention assumes the usual position when the brakes are released. Initial winding of the brake staff 10 takes up the live end of the chain, rotating the sheave 26, pulling the lever 23 and the jaw 19 to the right in Fig. 2, and taking up the slack in the brake rigging. The weight on the left side of the pin 22 and the relation between the axis of this pin and the line joining the axis of the pin 27 and the point of coaction between the chain and the staff 10, causes the lever 23 to remain in the position illustrated in Figs. 2 and 4, while the slack is being taken up. When additional power is applied to the brake staff the lever begins to rotate in a clockwise direction towards the position shown in Figs. 1 and 3, which brings the spike or tooth 35 into binding engagement with the chain, and gives the live end of the chain the mechanical advantage afforded by the lever. Preferably the brake staff is equipped with the spiral drum 36 which serves to increase the radius of the staff in the initial movement corresponding to taking up the normal slack and also to cause the chain to wind upwardly on the staff. This upward winding may assist in causing the lever 23 to begin its rotation when the slack has been taken up and the braking pressure is to be applied.

When the slack is being taken up the chain 29 slides freely over the lever 23, but as soon as the lever begins to rotate and the spike engages the dead end of the chain, the spike becomes the fulcrum of the lever with the load applied at 22 and the force applied by the live end of the chain through the sheave 26, thus giving a very powerful mechanical advantage to the brake staff.

Figure 2:
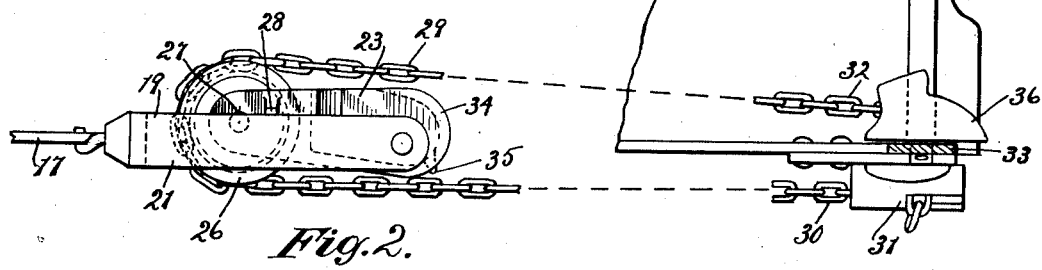
Fig. 2 is a side elevation with the parts in the position they assume when the slack is taken up.
Figure 3:
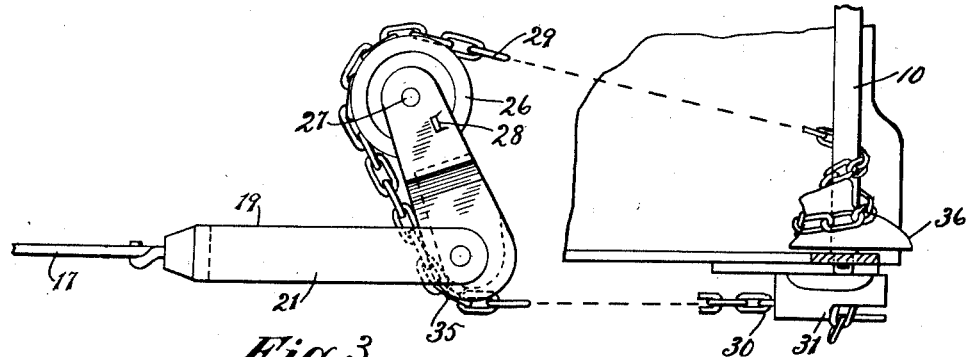
Fig. 3 is a similar side elevation showing the parts in the position they assume in applying the braking pressure.

Upon releasing the brakes the lever 33 will rotate counter clockwise to the position shown in Fig. 2, the spike 35 will release the dead end of the chain and permit the jaw and the lever to move to the left in Fig. 2, and the brake rigging will assume a slack condition similar to that assumed by the conventional brake gear.

The multiplying lever, and the jaw, when necessary, may be cheaply manufactured and supplied to car owners as an attachment for existing hand brakes, and in new work the improvement may be added at a very small cost.

Use has been made of specific description and illustration in order to disclose the invention, but it is intended that nothing contained herein shall unnecessarily limit the following claims, or require a construction thereof that would permit the substance of the invention to be used without infringement.

I claim as my invention:

1. In a brake mechanism for railway cars, the combination of a foundation brake gear, a jaw operatively connected with the foundation brake gear, a lever pivoted at one end in the jaw and having a sheave at the opposite end, a brake shaft and a chain looped about the sheave and lever with one end in winding engagement with the brake staff and the other end anchored.

2. In a brake mechanism for railway cars, the combination of a foundation brake gear, a jaw operatively connected with the foundation brake gear, a multiplying lever pivotally mounted in the said jaw, a brake shaft, a chain looped about said lever with one end in winding engagement with the brake shaft and the other end anchored, a sheave carried by the multiplying lever to facilitate movement of the chain with respect to the lever, and means for checking movement of the chain with respect to the lever when the latter is rotated.

3. In a brake mechanism for railway cars, the combination of a foundation brake gear, a jaw operatively connected with the foundation brake gear, a lever fulcrumed in said jaw, means for supporting the lever substantially in alignment with said jaw, a sheave carried by said lever at a point remote from the fulcrum of the lever, a brake shaft, a chain looped about the lever and the sheave with one end in winding engagement with the brake shaft and the other end anchored, and means on the lever adjacent to the fulcrum for binding against the chain when the lever is rotated.

4. In a brake mechanism for railway cars, the combination of a foundation brake gear, a bifurcated jaw, operatively connected with the foundation brake gear, a lever pivoted at one end to the open end of the jaw, means for supporting the lever between the arms of the jaw and substantially in alignment therewith, a sheave carried by the free end of the lever, a brake shaft, a chain looped about the lever and sheave with one end in winding engagement with the brake shaft and the other end anchored, and means on the pivoted end of the lever for binding against the chain.

5. In a brake mechanism for railway cars, the combination of brake shoes, a jaw operatively connected with the brake shoes, a lever rotatably mounted in said jaw, a brake shaft, a chain looped about said lever with one end anchored and the other end in winding engagement with the brake shaft, and means for effecting a binding engagement between the chain and the lever upon the rotation of the lever.

6. An article of manufacture, including a bifurcated jaw, a lever in said jaw, a fulcrum pin pivoting the lever to the jaw, a sheave journaled in one end of the lever and chain engaging means on the other end of the lever.

7. In a brake mechanism for railway cars, the combination of brake shoes, a brake shaft and a connection between them including a pivoted lever, a chain looped about the lever, and freely movable with respect to the lever while the slack is being taken up, and means for effecting a binding engagement between the chain and the lever when the slack is taken up.

8. The combination of brake shoes, a brake shaft and a connection between them including a rotatable lever having arms of different length, a chain looped about the lever with one end connected with the brake shaft and the other end anchored, means for supporting the lever with the longer arm directed substantially opposite to the pull on chain, and means for effecting a binding engagement between the short arm of the lever and the chain upon rotation of the long arm toward the direction of the pull on the chain.

9. The combination of brake shoes, a brake shaft and a connection between them including a jaw, a lever pivoted in the jaw and divided by the pivot into a long and a short arm, a chain looped about the lever with one end connected with the shaft and the other end anchored, means for supporting the lever with the axis of the longer arm at an angle to a line between the pivot and the point of application of the pull to the brake shaft, said chain being freely movable with respect to the lever in its supported position and means for effecting a binding engagement between the short arm and the chain when the lever is rotated.

10. The combination of brake shoes, a brake shaft and a connection between them, including a jaw, a lever pivoted in the jaw so that it is divided into a long arm and a short arm, a brake shaft, a chain looped around the lever with one end connected with the brake shaft and the other end anchored, and means for supporting the lever in such position that it will move with the jaw under a slack taking pull and will rotate relative to the jaw under a stronger pull.

In testimony whereof I affix my signature.

PERCY B. CAMP.